Jan. 24, 1961   E. R. HARTILL ET AL   2,969,415
ELECTRIC CABLE TERMINATIONS

Filed May 27, 1958   2 Sheets-Sheet 2

INVENTORS
ERIC RAYMOND HARTILL
NORMAN BASIL HEWETT
ARTHUR WILLIAM PIMM
BY Lawsey and Taylor
ATTORNEYS

United States Patent Office 2,969,415
Patented Jan. 24, 1961

2,969,415
ELECTRIC CABLE TERMINATIONS

Eric Raymond Hartill, Sale, Norman Basil Hewett, London, and Arthur William Pimm, Salford, England, assignors to Metropolitan-Vickers Electrical Company Limited, London, England, a company of Great Britain Filed May 27, 1958, Ser. No. 738,103

Claims priority, application Great Britain May 31, 1957

4 Claims. (Cl. 174—19)

This invention relates to terminations for electric power cables.

It is concerned with providing a termination for an electric power cable of the type set forth in our copending patent application No. 738,060 which discloses an electric power cable having a central duct for the purpose of carrying cooling fluid. The current carrying conductors are preferably positioned around said duct.

It is an object of the invention to provide a cable termination both for the cooling fluid and the electric current.

According to the present invention a termination for an electric power cable of the type set forth comprises a tubular member of conductive material with the current carrying conductors of the cable secured around the external surface of said tubular member and wherein the cooling fluid supply is taken through the interior thereof to the central duct in the cable.

Preferably the tubular member has a surrounding skirt attached thereto defining an annular space between the skirt and the remainder of the member, and the current carrying conductors are secured in said annular space.

The termination member may be threaded internally so that a fluid carrying pipe or hose can be secured thereto for the purpose of leading cooling fluid to and from the cable. In addition, an external thread may be provided to the termination member and a current take-off lead may be secured thereto.

In order that the invention may be more fully understood reference will now be made to the drawing accompanying this specification, in which.

Figure 1:
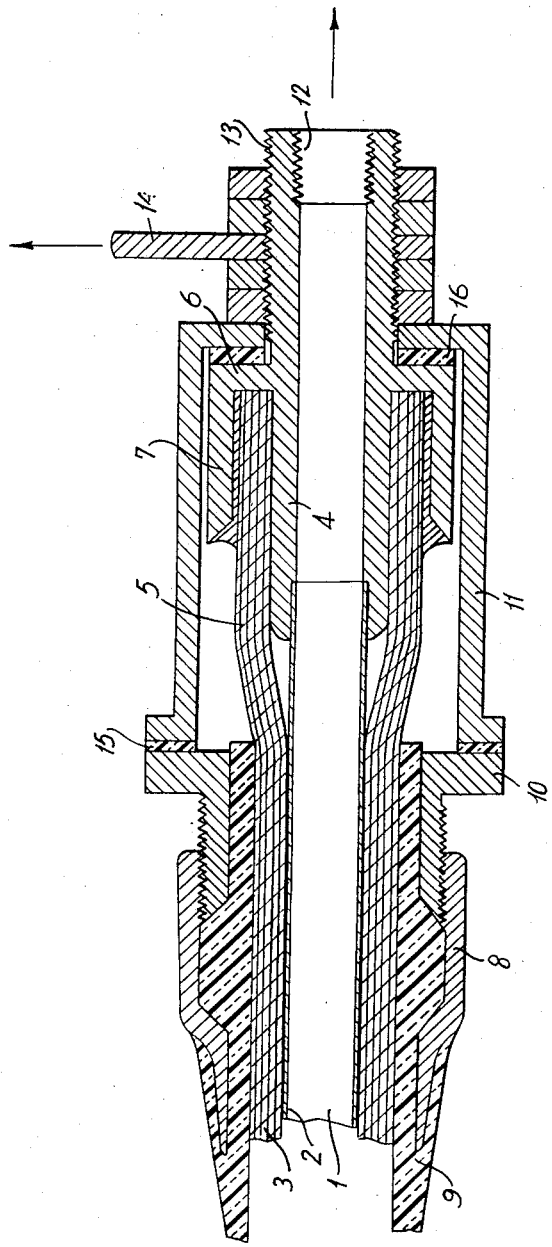
Fig. 1 shows one embodiment of the invention in section.

In Fig. 1 an electric power cable has a central duct 1 carrying cooling fluid which is defined by walling 2 around which is wound stranded conductors 3 which in turn are covered by an insulating layer 9 of polythene. According to the invention a termination is provided both for the electrical connection and for the supply of cooling fluid. This termination comprises a termination member 4 of tubular shape having the end portions 5 of the conductors secured around the external surface thereof. The termination member 4 also has a lug 6 which projects laterally from the member and is formed with a depending skirt 7 so as to define an annular space between skirt 7 and the main portion of member 4. The end portions 5 of the conductors are secured in this annular space and are sweated to the member as shown.

A metal gland nut 8 is bonded into the outer polythene layer 9 of insulation and a threaded ring 10 is tightened thereon to form a sealed gland in well known manner. To protect the joint between cable and termination an outer housing 11 is provided sealed at one end to ring 10 and the other end to lug 6 by means of gaskets 15 and 16. The housing is removable to enable the joint to be dismantled. Member 4 may be tapped internally at 12 to accommodate the necessary hose or tube to carry the cooling fluid. Thus the cooling fluid is taken straight out of the cable in order to avoid bends in the flow path which would increase the pressure required to force the fluid through the cable. The member 4 is also threaded externally at 13 to provide an electrical connection for a current take off lead 14 at right angles to the cable.

If the cable termination is at a high potential to earth then a suitable insulating tube of plastic or other material will be required to carry the liquid from the source at earth potential to the cable termination.

Figure 2:
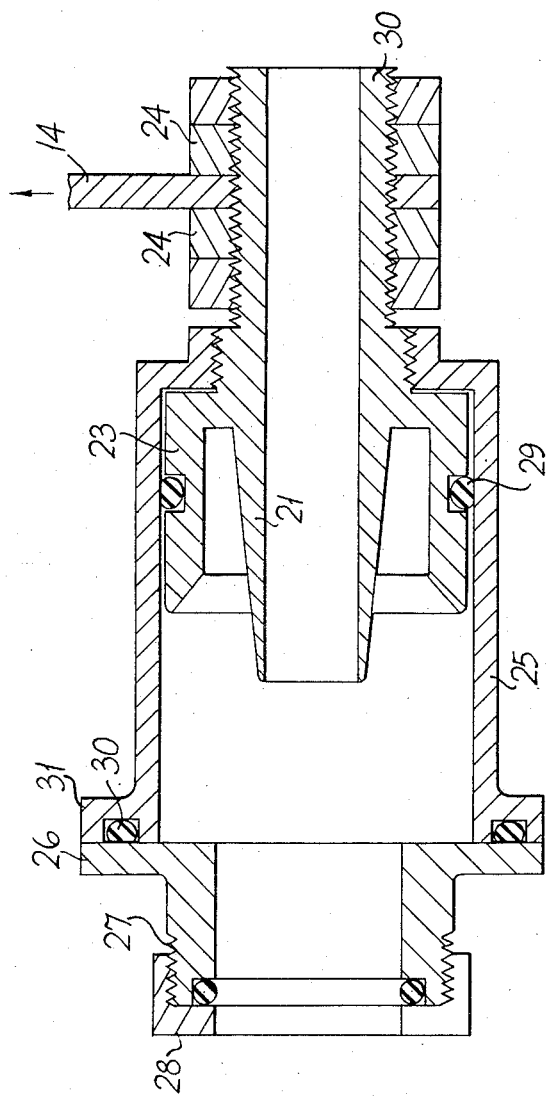
Fig. 2 shows an alternative embodiment.

Referring now to Fig. 2 there is shown therein an alternative embodiment of the invention. The figure shows the cable termination only without the cable connected thereto. The termination comprises a termination member 21 similar to the termination member 4 of Fig. 1 and having a similar lug 22 and depending skirt 23 defining an annular space for the end portions of the cable conductors to be soldered between skirt 23 and the main portion of member 21. Member 21 has an externally threaded portion 30 to which an electrical take-off lead extending at right angles to the cable can be secured between nuts 24 threaded on portion 30. Terminal member 21 is surrounded by a housing 25 terminating in a flange 31 to which is bolted a flange piece 26 having an externally threaded portion 27 to which a pressure nut 28 securing the cable insulation can be screwed.

Sealing is provided between skirt 23 of terminal member 21 and the housing 25 by means of an O ring 29 the external circumference of which bears against housing 25. An O ring 30 is included in the interface between housing 25 and flange piece 26 and a further O ring is included between the pressure nut 28 and flange piece 27.

It will be realised that whereas in Fig. 1 the sealing members 15 and 16 are in parallel planes, in the Fig. 2 arrangement sealing members 29 and 30 are in quadrature planes, which arrangement allows of more axial latitude in the cable termination.

It will be appreciated that in both the arrangements the liquid coolant of the cable also cools the joints.

What we claim is:

1. A cable termination for an electric power cable having a central duct for the purpose of carrying cooling fluid comprising a tubular member of conductive material, a cylindrical skirt dependent from said tubular member and spaced therefrom, said skirt surrounding said tubular member over at least a portion of the length thereof to define an annular space between the inner surface of the skirt and the outer surface of the tubular member, current carrying conductors of a cable, secured within said annular space, said tubular member being provided with fluid coupling means to the interior thereof and with external electrical connection means, a protective housing surrounding said skirt, means for sealing one end of said housing to said skirt in a fluid-tight manner, and means for sealing the other end of the housing to the periphery of a cable.

2. A cable termination for an electric power cable having a central duct for the purpose of carrying cooling fluid comprising a tubular member of conductive material, a cylindrical skirt dependent from said tubular member and spaced therefrom, said skirt surrounding said tubular member over at least a portion of the length thereof to define an annular space between the inner surface of the skirt and the outer surface of the tubular member, carrying conductors of a cable secured within said annular space, said tubular member being provided with fluid coupling means to the interior thereof and with external electrical connection means, a tubular protective housing surrounding said skirt, means for sealing one end of said housing to the periphery of a cable, and a seal between the inner surface of said housing and the outer surface of said skirt.

3. A cable termination for an electric power cable having a central duct for the purpose of carrying cooling fluid comprising a tubular member of conductive material, a cylindrical skirt dependent from said tubular member and spaced therefrom, said skirt surrounding said tubular member over at least a portion of the length thereof to define an annular space between the inner surface of the skirt and the outer surface of the tubular member, current carrying conductors of a cable secured in said annular space, said tubular member being provided with fluid coupling means to the interior thereof and with external electrical connection means, a gland nut bonded to the insulation of the cable, a threaded ring tightened on said gland nut to form a sealed gland, said threaded ring carrying an outwardly extending flange, and a tubular protective housing detachably secured to said tubular member and surrounding said skirt and sealed thereto and to said flange.

4. A cable termination for an electric power cable having a central duct for the purpose of carrying cooling fluid comprising a tubular member of conductive material, a cylindrical skirt dependent from said tubular member and spaced therefrom, said skirt surrounding said tubular member over at least a portion of the length thereof to define an annular space between the inner surface of the skirt and the outer surface of the tubular member, current carrying conductors of a cable secured within said annular space, said tubular member being provided with fluid coupling means to the interior thereof and with external electrical connection means, a gland nut bonded to the insulation of the cable, a threaded ring tightened on said gland nut to form a sealed gland, said threaded ring carrying an outwardly extending flange, a tubular protective housing detachably secured to said tubular member and surrounding said skirt and sealed to said flange, and a seal between the inner surface of said housing and the outer surface of said skirt.

References Cited in the file of this patent

UNITED STATES PATENTS

| | | |
|---|---|---|
| 1,223,864 | French | Apr. 24, 1917 |
| 1,957,995 | Emanueli | May 8, 1934 |
| 2,479,483 | Ekleberry | Aug. 16, 1949 |
| 2,883,513 | Schnabel | Apr. 21, 1959 |

FOREIGN PATENTS

| | | |
|---|---|---|
| 635,926 | Great Britain | Apr. 19, 1950 |